(12) United States Patent  
Friggstad et al.

(10) Patent No.: US 7,540,332 B2  
(45) Date of Patent: Jun. 2, 2009

(54) HYDRAULIC CONTROL SYSTEM HAVING AN UPPER DEPTH STOP VALVE WITH BYPASS

(75) Inventors: Terrance A. Friggstad, Grasswood (CA); Dean J. Mayerle, Saskatoon (CA)

(73) Assignee: CNH Canada, Ltd. (CA)

( * ) Notice: Subject to any disclaimer, the term of this patent is extended or adjusted under 35 U.S.C. 154(b) by 23 days.

(21) Appl. No.: 11/610,942

(22) Filed: Dec. 14, 2006

(65) Prior Publication Data

US 2008/0142234 A1 Jun. 19, 2008

(51) Int. Cl.  
*A01B 63/00* (2006.01)

(52) U.S. Cl. .................. 172/482; 172/311; 172/322

(58) Field of Classification Search ............ 172/2, 172/482, 311, 322, 473; 91/405, 394, 395  
See application file for complete search history.

(56) References Cited

U.S. PATENT DOCUMENTS

| | | | |
|---|---|---|---|
| 3,666,284 A | 5/1972 | Hunter et al. | |
| 3,731,749 A | 5/1973 | Sullivan et al. | |
| 4,086,843 A * | 5/1978 | Lorimor | 91/517 |
| 4,151,886 A * | 5/1979 | Boetto et al. | 172/311 |
| 4,317,489 A | 3/1982 | Steinbach | |
| 4,344,733 A * | 8/1982 | Hirsch | 414/694 |
| 4,641,388 A * | 2/1987 | Bennett et al. | 14/71.7 |
| 4,738,315 A | 4/1988 | Kinzenbaw | |
| 5,042,589 A * | 8/1991 | Hundeby et al. | 172/462 |
| 5,152,347 A * | 10/1992 | Miller | 172/7 |
| 5,348,101 A | 9/1994 | Fox et al. | |
| 5,957,218 A | 9/1999 | Noonan et al. | |
| 6,000,315 A * | 12/1999 | Graham et al. | 91/520 |
| 6,035,943 A * | 3/2000 | Gerein et al. | 172/328 |
| 6,068,064 A * | 5/2000 | Bettin et al. | 172/413 |
| 6,076,611 A | 6/2000 | Rozendaal et al. | |
| 6,131,669 A * | 10/2000 | Friggstad et al. | 172/311 |
| 6,209,657 B1 * | 4/2001 | Friggstad | 172/322 |
| 6,305,478 B1 * | 10/2001 | Friggstad | 172/458 |
| 6,318,477 B1 * | 11/2001 | Bettin | 172/452 |
| 6,786,130 B2 | 9/2004 | Steinlage et al. | |
| 2007/0023195 A1 * | 2/2007 | Peck et al. | 172/311 |

* cited by examiner

*Primary Examiner*—Thomas B Will  
*Assistant Examiner*—Matthew D Troutman  
(74) *Attorney, Agent, or Firm*—Rebecca Henkel (57) ABSTRACT

A hydraulic control system for use with a farm implement is configured to move an implement frame between a first height corresponding to a planting position, a second height corresponding to a field transport position, a third height corresponding to a lock up position and a fourth height corresponding to a road transport position. At least one hydraulic cylinder is mounted to a rock shaft connected to the implement frame to move the implement frame between the first height, the second, the third height and the fourth height. At least one depth stop valve is in communication with the hydraulic cylinder. The depth stop valve includes a bypass configured to allow controlled movement of the hydraulic cylinder between the second position and the third positions.

15 Claims, 5 Drawing Sheets

HYDRAULIC CONTROL SYSTEM HAVING AN UPPER DEPTH STOP VALVE WITH BYPASS

BACKGROUND OF THE INVENTION

1. Field of the Invention

The present invention relates generally to agricultural implements such as agricultural planters. More particularly, the present invention relates to an agricultural implement having at least one ground engaging tool supported on an implement frame and a fluid circuit to control movement of the implement frame between working and transport positions. Even more particularly, the present invention is directed to a fluid control circuit for controlling movement of the implement frame, having an upper depth stop valve with a bypass in communication with a hydraulic cylinder to allow controlled upward movement of the tool frame between a field transport position and a road transport position.

2. Discussion of the Related Art

Conventional planters typically include a series of evenly spaced row planter units connected to an implement frame and/or tool bar so as to be towed across a field. The row planter units are generally configured to plant particulate product (i.e., seed, herbicide, pesticide, fertilizer, etc.) in evenly spaced individual rows. The planter is usually towed by a propelling vehicle such as a tractor or other prime mover across the field. As the planter reaches the end of a row, or requires transport from a field to another more remote location, it is often necessary to reconfigure the planter from a field planting configuration or position to a field transport, row transport or headland position (for movement between planting rows), or a road transport position.

In many prior art systems, hydraulic lift systems are utilized to reconfigure the planter to and from the above noted positions. A rockshaft, tool bar or a similarly moveable member is mounted to the implement frame so as to support and move one or more such ground engaging tool. Movement of the implement frame, and thus the tools, is typically accomplished using at least one hydraulic cylinder operatively extending between the frame and the moveable member. As such, the moveable member can be raised and lowered so as to engage the tools with the ground or be configured for transport.

In such prior art systems, remote hydraulic valves provide hydraulic flows to locations on the moveable member to adjust the positioning of the same. The valves are controlled in an operator station in the cab of the vehicle, most commonly by manipulating a control device that provides a signal and indicates a desired flow rate to or from the hydraulic valve. The hydraulic valves are typically connected to a manifold or manifolds, most commonly located at the rear of the vehicle, to which hydraulic actuators are mounted. The hydraulic actuators include such things as hydraulic motors and cylinders. By manipulating the control device, the operator can vary the flow direction and the flow rate to the manifold, and hence to the hydraulic actuators located on the implement.

However, known hydraulic systems have drawbacks. For example, in most prior art systems, the maximum road transport position or height (height used herein means the clearance of the tool frame from the ground) and the field transport height is often the same. This is due to the fact that when an operator strokes a master cylinder controlling the height of the implement, the cylinders typically bottom out thereby limiting the maximum raised height of the planter from the ground. The limited maximum height of the road transport position has proved problematic when the planter needs to be moved long distances over ditches and other uneven surfaces. Portions of the planter may not have adequate clearance to cross these uneven surfaces. Likewise, the height (clearance of the implement frame from the ground) of the field transport position in many of these systems is unnecessarily high. As the field transport position most commonly only requires turning between adjacent rows, it is unnecessary to raise the system to the same height required for road transport.

Even in those systems that can achieve different road transport and field transport heights, there is not an adequate system to control the movement of the implement from the field transport to the road transport position. In many systems there is not an adequate upper stop. As a result, the implement frame may be raised to or near a road transport position when only a field transport height is needed. It is desirable to not only control the transition between a field transport position and a road transport position, but to also provide an upper depth or height stop once the tool frame has reached the field transport position as improper or haphazard movement between the field transport and the road transport positions can damage equipment. Furthermore, it is often unnecessary and time consuming to raise the tool frame to a fully raised position during planting operations. As such, it is preferable to have a system wherein movement between a field transport and planting position can be achieved quickly and stopped before moving into a road transport position, while at the same time controlled steady movement between the field transport and the road transport positions can be achieved when necessary.

There have been some attempts at providing a planter wherein controlled movement between distinct field transport and road transport configurations can be achieved. For example, one known system allows for an upper depth stop functionality via a series of complex electronic controls. This system, while somewhat satisfactory for its intended purpose, exhibits drawbacks as the electronic upper depth stop system is overly complex and costly to manufacture.

Therefore, there is a need or desire for a hydraulic control system for a work vehicle such as a planter to address the drawbacks described above. The hydraulic control system should also be configured to be utilized with a wide variety of bar supported implements frames and/or vehicles in addition to those related to agriculture. The hydraulic control system should also be versatile so as extend its lifetime and minimize replacement. Also, the hydraulic system should be simple in design so as to reduce costs associated with labor and manufacturing.

SUMMARY OF THE INVENTION

The present invention provides a hydraulic control system, an agricultural implement and a method of moving an agricultural frame that addresses the drawbacks described above. The hydraulic control system of the invention includes an upper depth stop valve with a bypass allowing for controlled movement between field transport and road transport positions. The hydraulic control system of the invention is also simple in design and parts for ready manufacturability.

In a first embodiment of the present invention, a hydraulic control system for use with an agricultural implement frame is configured to move an implement frame between a first position, a second position and a third position in relation to a supporting surface. The system includes at least one hydraulic cylinder mounted to the implement frame configured to move the frame between the first position, the second position and the third position. A depth stop valve with a bypass is in communication with the hydraulic cylinder and configured to allow controlled movement of the hydraulic cylinder between the second position and the third position.

In the preferred embodiment of the system, fluid flows freely through the depth stop valve during movement of the frame between the first position and the second position. Once the frame reaches a second position, fluid flow through the depth stop valve is at least partially restricted. Once the frame reaches the second position, fluid moves through a bypass in the poppet of the depth stop valve to actuate additional movement of the hydraulic cylinders between the second position and the third position.

In one embodiment, the agricultural implement frame is pivotally connected to a rockshaft, and the rockshaft is pivotally mounted to a tool bar and a rod end of a hydraulic cylinder. The rockshaft may be locked to the tool bar in the third position. The rockshaft may be locked to the tool bar in the third position by a locking pin.

In another embodiment, the present invention provides an agricultural implement that includes an implement frame configured to move between a first height, a second height and a third height, from a supporting surface. The agricultural implement includes a hydraulic control system for controlling movement of the tool bar that includes at least one hydraulic cylinder mounted to the implement frame configured to move the frame between the first height, the second and the third height and a depth stop valve with a bypass in communication with the hydraulic cylinder configured to allow controlled movement of the hydraulic cylinder between the second height and the third height.

In the preferred embodiment of the frame, fluid flows freely through the depth stop valve during movement of the frame between the first height and the second height. Fluid flow through the depth stop valve is at least partially restricted once the frame reaches a second height. Preferably, at the first height the tool frame is orientated in planting position, at the second height the tool bar is orientated in a field transport position above the planting position and at the third height the tool bar is orientated in a locking position above the planting position.

Preferably, the agricultural implement frame is pivotally connected to a rockshaft, and the rockshaft is pivotally mounted to a tool bar and a rod end of a hydraulic cylinder. The rockshaft may be locked to the tool bar in the third position.

In a final embodiment, a method of moving an implement frame includes actuating at least one hydraulic cylinder mounted to the implement frame to move the implement frame between a first height and a second height, and actuating the at least one hydraulic cylinder to move the frame between the second height and a third height. The movement of the hydraulic cylinder between the second height and the third height is controlled by movement of a fluid through a bypass in a depth stop valve. Preferably, fluid flows freely through the depth stop valve during movement of the frame between the first height and the second height. The fluid flow through the depth stop valve is at least partially restricted once the frame reaches a second height. In the preferred embodiment, the agricultural implement frame is pivotally connected to a rockshaft, and the rockshaft is pivotally mounted to a tool bar and a rod end of a hydraulic cylinder.

Other aspects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

DETAILED DESCRIPTION OF THE PREFERRED EMBODIMENTS

In accordance with the present invention, an agricultural implement 22 is provided to be conveyed by a self propelled vehicle such as a tractor, combine or similar vehicle capable of use in an agricultural field. The agricultural implement may be attached to the vehicle in any of a variety of different manners. For example, the agricultural implement 22 may be securely mounted to either the front or rear of the vehicle chassis so as to be carried by the vehicle. Alternatively, and as embodied herein for purpose of illustration and not limitation, the agricultural implement may be attached to the vehicle by a one-point, two-point or three-point hitch assembly.

Figure 6:
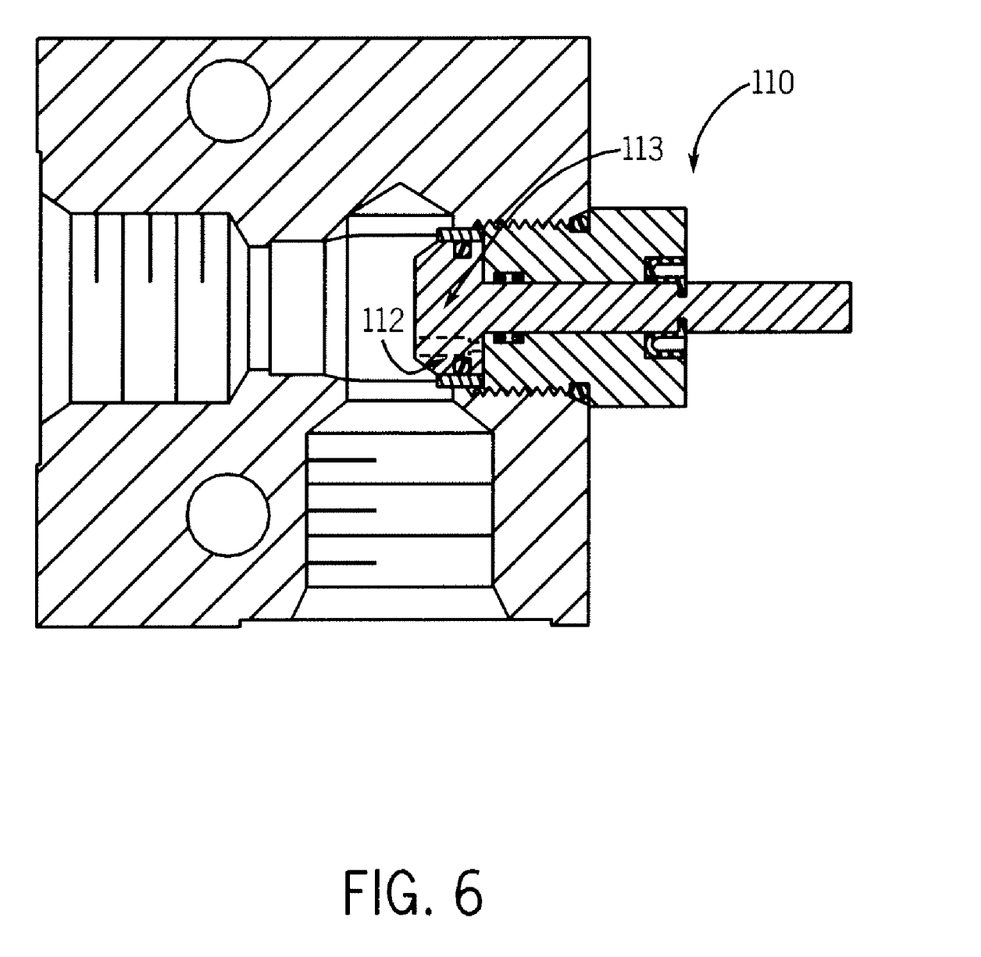
FIG. 6 is a schematic illustration of a poppet valve with a bypass to be used with the hydraulic system of the present invention.
Figure 7:
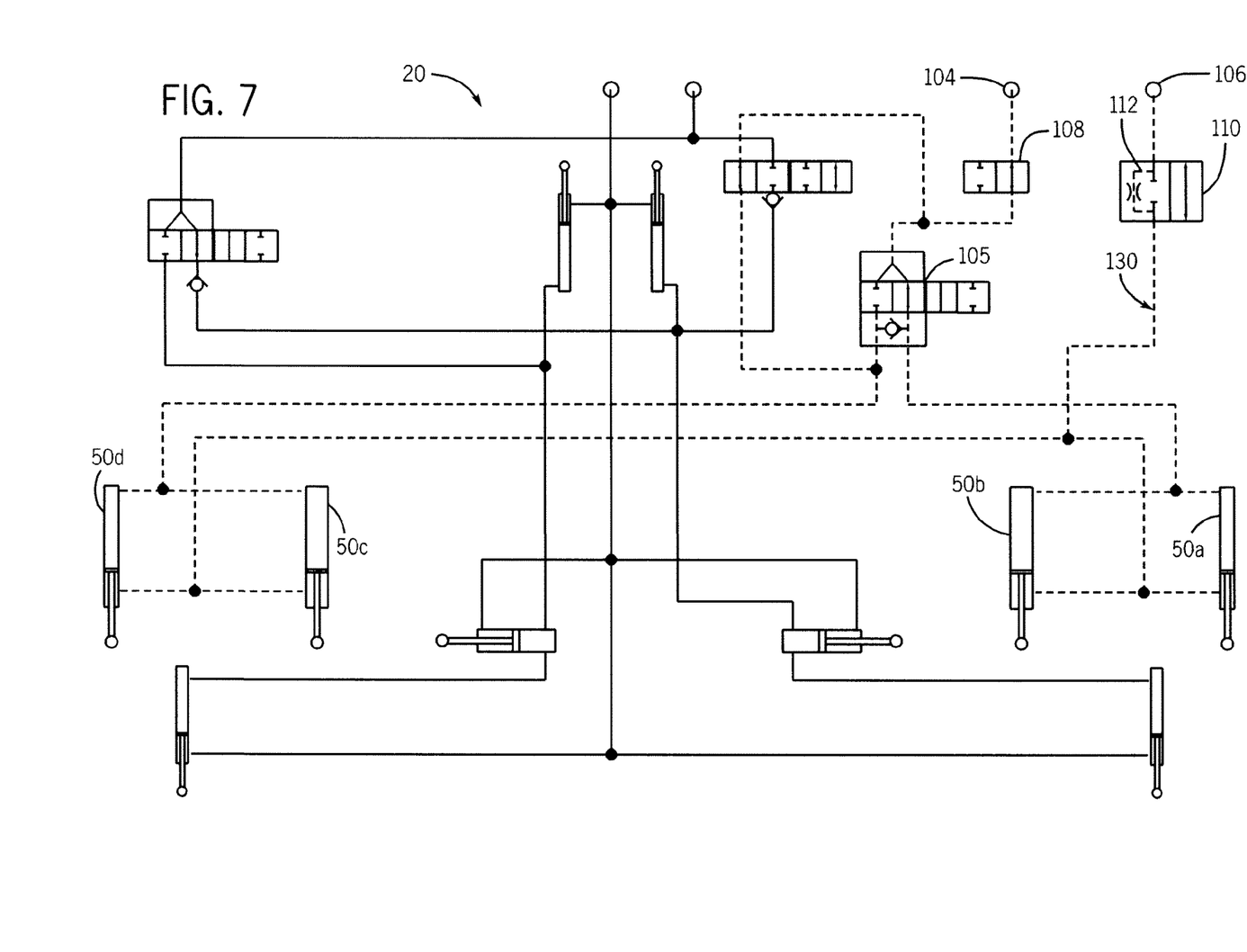
FIG. 7 illustrates a fluid circuit diagram of the hydraulic control system in accordance with the present invention.

FIG. 7 illustrates a hydraulic control system 20 in accordance with the present invention in combination with an agricultural implement 22. The hydraulic control system 20 is generally configured to arrange an implement frame or implement tool frame 34 of the agricultural implement 22 (illustrated in FIGS. 1-6) in alternative road transport 26 (FIG. 5), planting 28 (FIG. 2), field transport, row transport or headland 30 (FIG. 3), and lock up 29 (FIG. 4) positions. The hydraulic control system 20 further enables the implement frame 34 to be moved from distinct field transport 30 and road transport 26 positions in a controlled manner due to a bypass 112 located in the poppet 113 of an upper depth stop valve 110 of the hydraulic control system 20.

FIGS. 1-5 show one representative embodiment of agricultural implement 22, including an implement frame 34 extending away from the direction of movement of the plow. Pivotally connected to the rear of the implement frame 34 by a pin 31 is a rear wheel assembly 32 (FIGS. 2-5) including rear tires 33. The implement frame 34 is supported at its front end by the tractor via a hitch assembly (not shown) extending from a tool bar 36 and tires 35 and at its rear end by rear wheel assembly 32. The hitch assembly (not shown) may include known components such as a parallel linkage and hydraulic cylinder unit for connecting (and raising) the forward end of the frame 34 for connection to a tractor hitch, (not shown). Extending transversely from the frame 34 is a substructure such as a tool bar 36. The frame 34 and tool bar 36 are constructed of sufficiently durable material, such as metal, using conventional techniques and components.

As is known in the art, ground working tools 38, such as individual planter units 37 are mounted to the implement frame 34. The invention, as persons skilled in the art will appreciate, is not limited to any particular row units, nor even to row units in general. For example, grain drills, could be mounted to the implement frame 34. Moreover, persons skilled in the art will appreciate that the implement frame 34 of the illustrated embodiment may serve as a carrier frame for other tools such as cultivator sweeps, chisel plows, sprayers, or anhydrous ammonia applicators, if desired.

As is discussed in greater detail below, the overall control and operation of the ground working tools 38 is performed by movement of the frame 34 using a fluid circuit 20 with a depth stop valve 110 having a bypass 112 located in the poppet 113 (FIG. 6). The implement frame 34 can be moved between road transport (or fourth height) 26 (FIG. 5), planting (or first height) 28 (FIG. 2), field transport (or second height) 30 (FIG. 3), and lock up (or third height) 29 (FIG. 4) positions as well as accommodate slight variations in the surface and soil type of the ground being traversed.

As embodied in FIGS. 1-5, the tool bar 36 is connected to the implement frame 34 via a z-shaped rocker plate or rock shaft 40 for movement of the implement frame 34 between, the above noted planting 28, field transport 30, lock up 29 and road transport 26 positions. In an alternative embodiment, several rock shafts 40 could pivotally extend between the implement frame 34 and the tool bar 36 depending on the size of the implement frame 34.

Rock shaft 40 may be constructed as is known in the art. In the illustrated embodiment, rockshaft 40 includes a central body 42 and a first connection flange 44 and a second connection flange 46. The first connection flange 44 is configured to pivotally attach to the rod end 48 of the hydraulic cylinder unit 50 at pivot point or pin 49. The implement frame 34 is pivotally connected to the central body 42 of the rockshaft at pivot point or pin 47. The second connection flange 46 is pivotally attached to the tool bar 36 at pivot point or pin 45. Rock shaft 40 further includes a hole 43 configured to align with hole 41 on tool bar 36 and receive a locking pin or other securing means therethrough to lock the rock shaft 40 to the tool bar 36 during road transport. A mounting plate 52 is connected to the implement frame 34 and to hydraulic cylinder unit 50. The rear wheel assembly 32 is also pivotally attached to the mounting plate 52 at pivot point 61.

Movement of the implement frame 34 to the various positions shown in FIGS. 2-5 is accomplished using the at least one hydraulic cylinder unit 50 extending between the rock shaft 40 and mounting plate 52. It should be understood that although only a single hydraulic cylinder 50 is shown, any number of cylinders could be used depending on the size of the implement frame 34. Furthermore, although a hydraulic cylinder unit 50 is referred to, any "fluid cylinder" could be used with the present invention.

The disclosed hydraulic cylinder unit 50 is preferably a double-acting hydraulic cylinder. A pin or other securing device passes through the end of the cylinder rod end 48 and through pivot point 49 on rock shaft 40 to operably connect the hydraulic cylinder unit 50 with the rockshaft 40. The opposite end of the hydraulic cylinder unit 50 is connected to mounting plate 52. The hydraulic cylinder 50 is preferably a telescopic device having a head chamber and a rod chamber, such that pressurization of the head chamber extends the length of the hydraulic cylinder unit 50 and pressurization of the rod chamber retracts the length of the hydraulic cylinder unit 50. Although the hydraulic cylinder unit 50 may be operated pneumatically, as noted above, the preferred embodiment is operated hydraulically using a pressurized fluid. It is further understood, however, that a hydraulic cylinder unit 50 likewise may refer to a similar fluid device such as linear actuator if desired. Operation of the hydraulic cylinder unit 50 is described further below.

Figure 1:
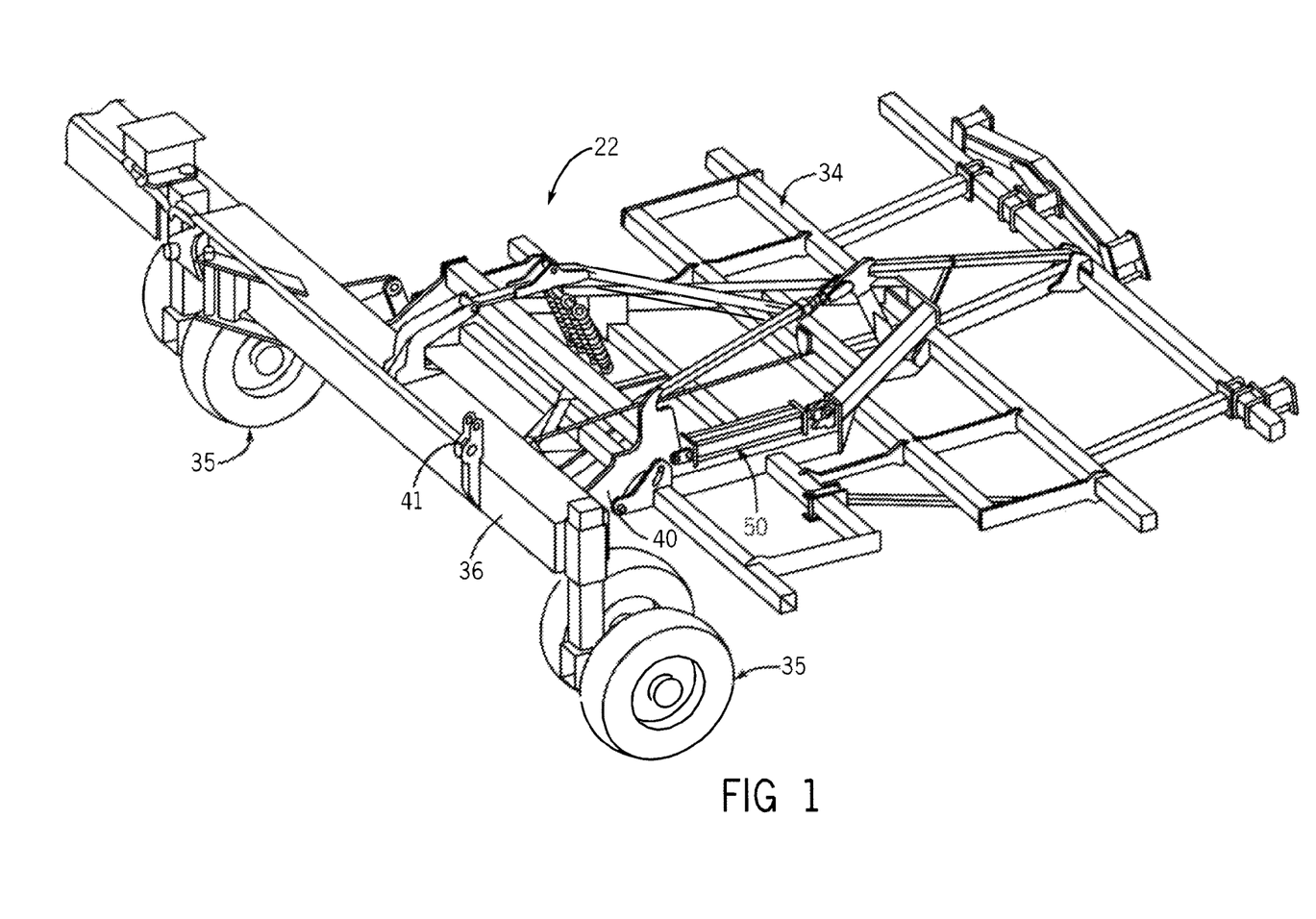
FIG. 1 illustrates a partial isometric view of a representative embodiment of an agricultural implement frame employing a hydraulic control system in accordance with the present invention.
Figure 2:
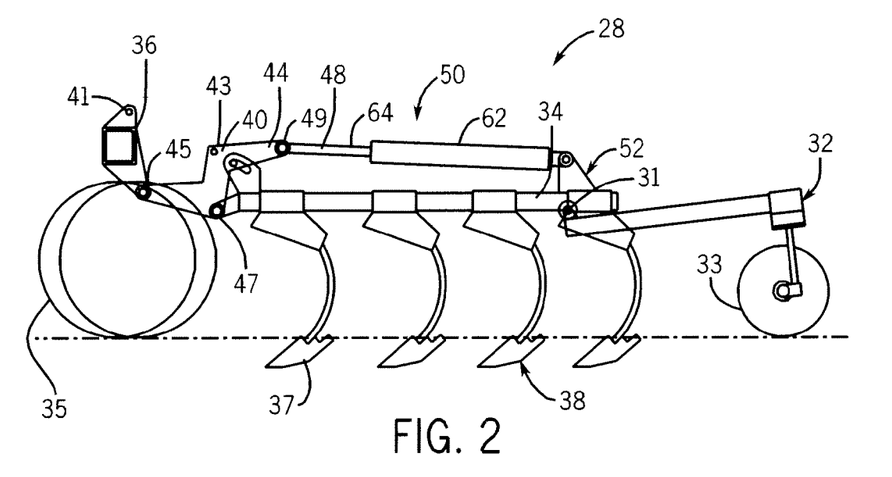
FIG. 2 is a schematic illustration of the agricultural implement in FIG. 1 in a field working or planting position.
Figure 3:
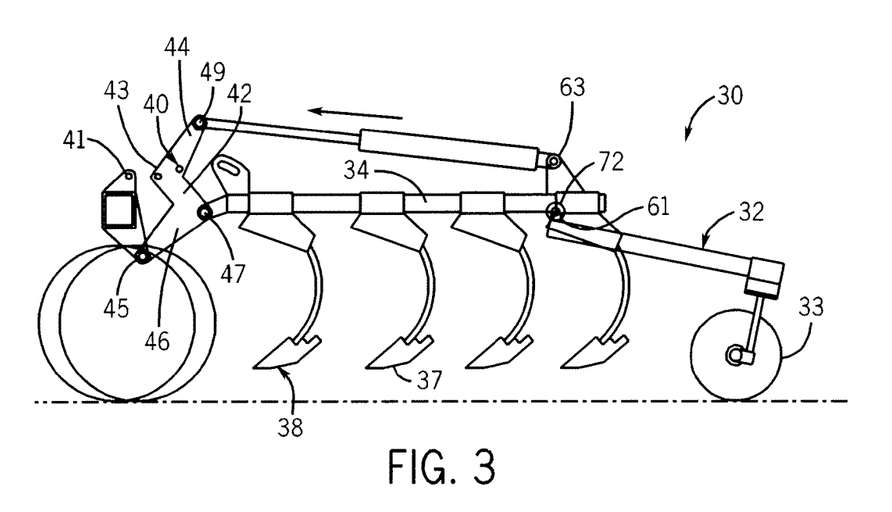
FIG. 3 is a schematic illustration of the agricultural implement in FIG. 1 in a row transport, field transport or headland position.
Figure 4:
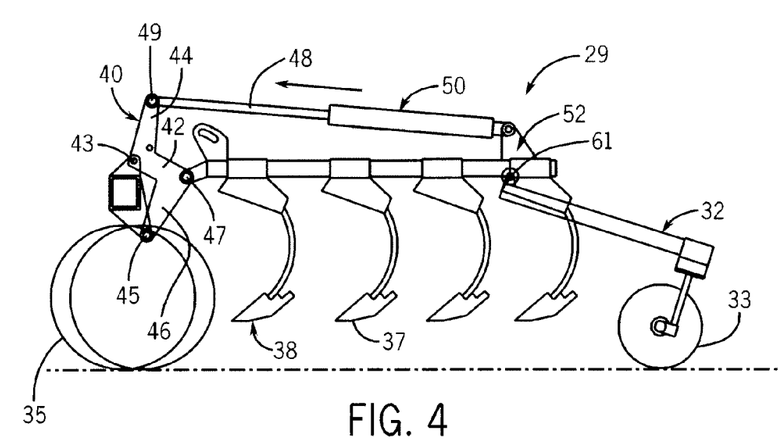
FIG. 4 is a schematic illustration of the agricultural implement in FIG. 1 in a lock up position with the rockshaft locked to the tool bar in preparation for road transport.
Figure 5:
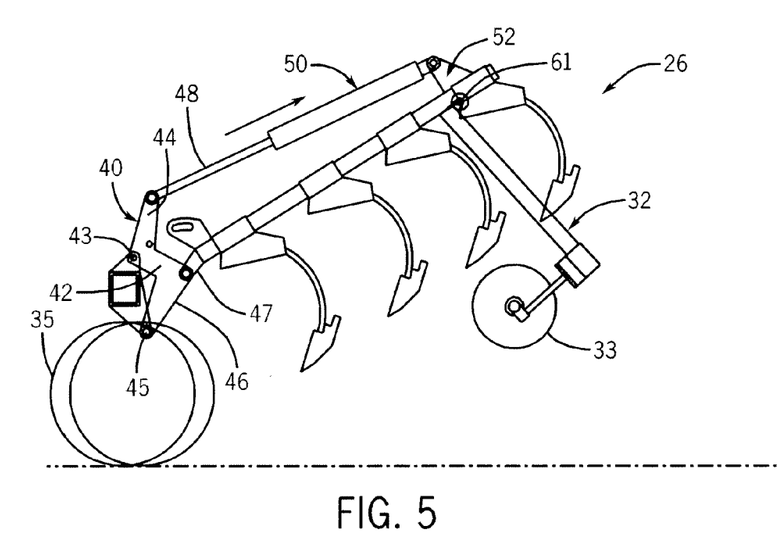
FIG. 5 is a schematic illustration of the agricultural implement in FIG. 1 rasing to a road transport position.

As the hydraulic cylinder unit 50 is extended from the planting position 28 shown in FIG. 2, the rock shaft 40 is pivoted against the tool bar 36 forward in the direction of travel of the plow. As the rock shaft pivots on pivot point 45 it moves the implement frame 34 out of the soil and into the field transport position 30 shown in FIG. 3. The arrows shown in FIGS. 3-5 illustrate the movement of the rod end 48 of the hydraulic cylinder unit 50 during different implement frame 34 movements. As discussed in greater detail below, if an operator continues to actuate the hydraulic cylinder unit 50 the rod end 48 of the hydraulic cylinder unit 50 continues to be extended from the field transport position 30. The rock shaft 40 is further pivoted against the tool bar 36 until the implement frame 34 is moved into a lock up position 29 shown in FIG. 4. Once in the lock up position 29 shown in FIG. 4, a pin, clamp or other locking mechanism extends through holes 41 and 43 and locks the rock shaft 40 to the tool bar 36. Once the rock shaft 40 is locked to the tool bar 36, the rod end 48 of the hydraulic cylinder unit 50 can be retracted to move the implement frame 34 into a road transport position 26 shown in FIG. 5. As the rod end 48 of the hydraulic cylinder unit 50 is retracted, the implement frame 34 pivots on the rock shaft at pivot point 47 thereby further raising the implement frame 34 towards the road transport position 26 shown in FIG. 5. FIG. 5 only shows the implement frame moving towards a road transport position. It should be understood that frame is completely upright in the road transport position.

FIG. 7 show a representative embodiment of the fluid circuit of the control system 20 of the present invention. Although the fluid circuit 20 may be a pneumatic system using air or a similar noncompressible gas, a hydraulic system using quality hydraulic fluid is preferred. Except as otherwise noted, conventional plumbing components and fixtures may be used for construction and assembly of the fluid circuit 20. Reference hereinafter is therefore made, for purpose of illustration and not limitation, to a fluid circuit 20 using a hydraulic fluid.

As noted above, implement frame 34 is connected to rock shaft 40. Rock shaft 40 is also connected to the hydraulic cylinder unit 50. Ground support wheels 35 and 33 support the frame as is known in the art. The implement frame is configured to pivot about corresponding pins 47 on rock shafts 40.

As discussed above, the hydraulic cylinder unit 50 moves the frame between the four positions illustrated in FIGS. 2-5. Referring now to the hydraulic schematic diagram of FIG. 7, the operation of the hydraulic control system 20 during lift sequences will be described. It should be understood that the focus of the invention is on the control of the upper depth stop valve circuit 130 shown in the dashed lines. The remaining solid lines of the system 20 are not the focus of the present invention and are included for illustrative purposes only. It is understood that a wide variety of alternative circuits could be utilized in addition to the disclosed upper depth stop circuit 130. In addition, it should be recognized that although only one hydraulic cylinder unit 50 is shown in the schematics of FIGS. 2-5, four units 50a-d are shown in FIG. 7. As noted above, several hydraulic cylinder units could be used depending on the overall size of the implement frame 34. The operation of each of the hydraulic cylinder units 50 is identical.

The movement of the implement frame 34 from the planting position 28 (FIG. 2) to the field transport position 30 (FIG. 3) will be initially described. The hydraulic components shown schematically in FIG. 7 may bear the same reference numerals as the component previously described. Thus, the hydraulic cylinder units 50a-d are labeled with corresponding reference numerals. As noted above, one advantage of the control system 20 is that it allows the implement frame 34 to achieve distinct positions in the field transport 30 and road transport 26 positions, while at the same time providing an initial stop once the implement frame 34 has reached the field transport position 30, thereby preventing unnecessary over rotation of the rock shaft 40.

As illustrated in FIG. 7, an inport 104 and an outport 106 are connected to a tractor hydraulic system (not shown) including an auxiliary valve, a hydraulic pump, a reservoir tank, and other hydraulic equipment. It will be understood that the fluid flow (and thus the pressure) may be reversed under operator control. The operation of the lift functions is controlled by activation of solenoid valves by an operator located in a tractor cab. Preferably the operator uses a touch type electronic monitor located within the cab of the prime mover. During operational movement of the implement 22 through the field, for example, a "RAISE" mode and a "PLANT" mode may be alternated in order to raise and lower the implement frame 34 between the planting position 28 and field transport position 30.

For example, while in the planting position 28, an operator may wish to raise the implement frame to a field transport position 30 at the end of a row. Upon selection of a "RAISE" mode, a solenoid valve is energized and oil is supplied to the inport 104, through valve block 108 to extend the cylinder units 50a-50d. As the hydraulic cylinder units 50a-50d are extended from the planting position 28 shown in FIG. 2, the rock shaft 40 is pivoted against the tool bar 36 and as a result, it moves the implement frame 34 out of the soil and into the row transport position 30 shown in FIG. 3.

As the hydraulic cylinder units 50a-50d are extending, fluid flows from the hydraulic cylinder units 50a-50d back towards outport 106. As the fluid from the hydraulic cylinder units 50a-50d the fluid joins together at some point just below the upper depth stop valve 110 having a bypass 112. As the fluid flows from the hydraulic cylinder units 50a-50d through the valve 110 and back into the tractor through the outport 106, the upper depth stop valve 110 is triggered and the tractor's detent shuts off the valve 110, (e.g. by closing poppet 113 in FIG. 6) preventing further free flow of fluid. As fluid flow is restricted, movement of the hydraulic cylinder units 50a-50d is retarded and movement of the implement frame 34 is slowed signaling to the operator that the optimum field transport position 30 has been achieved. Overrotation of the rock shaft 40 is thus prevented.

As noted above, however, fluid flow through the upper depth stop valve 110 is not completely eliminated. As illustrated in FIG. 6, the preferred depth stop valve 110 includes a small orifice or bypass 112 in the poppet 113. As a result, restricted fluid flow may occur through the bypass 112 of the valve 110 thereby slowly moving the implement frame 34 from the field transport position 30 (FIG. 3) to the lock up position 29 (FIG. 4). If an operator desires such movement to a lock up position 29, he continues to select the "RAISE" mode thereby continuing to stroke the hydraulic cylinder units 50-50d. The resulting movement of the implement frame 34 from the field transport position 30 (FIG. 3) to the lock up position 29 (FIG. 4) is much slower due to the restricted fluid flow through only the bypass 112 in valve 110. This allows for increased precision and safety as the rock shaft 40 is locked to the tool bar 36 for transition to the road transport 26 position.

Once in the lock up position 29, an operator can retract the hydraulic cylinder units 50a-50d thereby causing fluid flow back through valve 110. Because the rock shaft 40 is locked to the tool bar 36, as the rod end 48 of the hydraulic cylinder units 50a-50d are retracted, the implement frame 34 pivots on the rock shaft 40 at pivot point 47 thereby further raising the implement frame 34 into the road transport position 26 shown in FIG. 5.

As noted above, due to the depth stop function of the valve 110, an operator does not need to closely monitor the movement of the implement frame 34 between the planting 28 and field transport 30 positions. As the hydraulic cylinder units 50a-50d come up, valve 110 triggers the detent and restricts fluid flow to the hydraulic cylinder units 50a-50d. Recognizing that he is in a safe field transport position 30, the operator can thus turn around and go back down into a planting position 28. In order to return to a planting position 28, the operator initiates flow back through valve 110. The hydraulic cylinder units 50a-50d lower the implement frame 34 down into the field a planting position 28 and valve 108 is triggered to shut the fluid flow off.

Many changes and modifications could be made to the invention without departing from the spirit thereof. The scope of these changes will become apparent from the appended claims.

We claim:
1. An agricultural implement comprising:
an implement frame having two opposing sides configured to support at least one ground engaging tool and move between a first height, a second height and a third height, from a supporting surface;
a rock shaft which includes a central body, a first connection flange and a second connection flange;
a hydraulic cylinder having a rod end and a head chamber;
said first connection flange is pivotally attached to said rod end of said hydraulic cylinder;
a first side of the said two sides of said implement frame is pivotally connected to said central body of the rockshaft;
said second connection flange is pivotally attached to a tool bar and a front tire assembly;
a mounting plate is connected to the second side of the said two sides of said implement frame;
said head chamber of said hydraulic cylinder is attached to said mounting plate;
a rear wheel assembly is pivotally attached to said mounting plate; and
said hydraulic cylinder is configured to move the frame between the first position, the second position and the third position; and
a depth stop valve in communication with said hydraulic cylinder, the depth stop valve having a bypass configured to allow controlled movement of the hydraulic cylinder between the second position and the third position;
wherein:
fluid flows freely through the depth stop valve during movement of the implement frame between the first position and the second position; and
fluid moves through the bypass in the depth stop valve to actuate movement of the hydraulic cylinder between the second position and the third position.

2. The hydraulic control system of claim 1, wherein fluid flow through the depth stop valve is at least partially restricted once the frame reaches a second position.

3. The hydraulic control system of claim 1, wherein:
- at the first position the implement frame is orientated in a ground engaging position;
- in the second position the implement frame is at a greater height off the ground than in the first position; and
- in the third position the implement frame is at a greater height off the ground than in the first and second positions.

4. The hydraulic control system of claim 1, wherein the agricultural implement frame is pivotally connected to the rockshaft.

5. The hydraulic control system of claim 4, wherein the rockshaft is locked to said tool bar in the third position.

6. The hydraulic control system of claim 5, wherein the implement frame can be moved into a fourth position by retraction of the hydraulic cylinder from its position in the third position.

7. An agricultural implement comprising:
- an implement frame having two opposing sides configured to support at least one ground engaging tool and move between a first height, a second height and a third height, from a supporting surface;
- a rock shaft which includes a central body, a first connection flange and a second connection flange;
- a first side of the said two sides of said implement frame is pivotally connected to said central body of the rockshaft;
- said second connection flange is pivotally attached to a tool bar and a front tire assembly;
- a mounting plate is connected to the second side of the said two sides of said implement frame;
- a rear wheel assembly is pivotally attached to said mounting plate; and
- a hydraulic control system for controlling movement of the implement frame comprising,
- a hydraulic cylinder having a rod end and a head chamber;
- said first connection flange is pivotally attached to said rod end of said hydraulic cylinder;
- said head chamber of said hydraulic cylinder is attached to said mounting plate;
- wherein the hydraulic cylinder is configured to move the implement frame between the first height, the second height and the third height; and
- a depth stop valve with a bypass in communication with the hydraulic cylinder, the depth stop valve configured to allow controlled movement of the hydraulic cylinder between the second height and the third height;
- wherein:
- fluid flows freely through the depth stop valve during movement of the implement frame between the first position and the second position; and
- fluid moves through the bypass in the depth stop valve to actuate movement of the hydraulic cylinder between the second and the third position.

8. The agricultural implement of claim 7, wherein fluid flow through the depth stop valve is at least partially restricted once the implement frame reaches a second height.

9. The agricultural implement of claim 8, wherein the bypass is located in a poppet of the depth stop valve.

10. The agricultural implement of claim 7, wherein at the first height the implement frame is orientated in a planting position, at the second height the implement frame is orientated in a field transport position above the planting position and at the third height the implement frame is orientated in a locked position above the planting position.

11. The agricultural implement of claim 7, wherein the implement frame is pivotally connected to the rockshaft.

12. The agricultural implement of claim 10, wherein said rock shaft is locked to said tool bar in the third position.

13. A method of moving an implement frame, comprising the steps of:
- providing an implement fame having two opposing sides configured to support at least one ground engaging tool and move between a first height, a second height and a third height from a supporting surface;
- providing a rock shaft which includes a central body, a first connection flange and a second connection flange;
- providing a hydraulic cylinder having a rod end and a head chamber;
- providing a mounting plate connected to a first side of said two opposing sides of said implement frame and to said head chamber of said hydraulic cylinder;
- wherein said first connection flange is pivotally attached to said rod end of said hydraulic cylinder;
- wherein one end of said implement frame is pivotally connected to said central body of said rockshaft;
- actuating the hydraulic cylinder to move the frame between a first height and a second height;
- wherein fluid flows freely through a depth stop valve in communication with said hydraulic cylinder during movement of the implement frame between the first position and the second position; and
- actuating the hydraulic cylinder to move the frame between the second height and a third height;
- wherein the movement of the hydraulic cylinder between the second height and the third height is controlled by movement of fluid through a bypass in the depth stop valve.

14. The method of claim 13, wherein fluid flow through the depth stop valve is at least partially restricted once the implement frame reaches a second height.

15. The method of claim 14, wherein the bypass is located in a poppet of the depth stop valve.

* * * * *